United States Patent
Brekke et al.

(10) Patent No.: US 9,217,629 B2
(45) Date of Patent: Dec. 22, 2015

(54) DISPLACEMENT SENSOR, IN PARTICULAR FOR USE IN A SUBSEA DEVICE

(71) Applicant: Siemens Aktiengesellschaft, Munich (DE)

(72) Inventors: Endre Brekke, Trondheim (NO); Hessam Moussavinik, Trondheim (NO); Kjetil Volent, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 44 days.

(21) Appl. No.: 13/970,477

(22) Filed: Aug. 19, 2013

(65) Prior Publication Data

US 2014/0047925 A1    Feb. 20, 2014

(30) Foreign Application Priority Data

Aug. 17, 2012    (EP) .................................... 12180901

(51) Int. Cl.
| | |
|---|---|
| *G01B 7/16* | (2006.01) |
| *G01L 7/16* | (2006.01) |
| *G01D 5/04* | (2006.01) |
| *G01D 5/26* | (2006.01) |
| *G01D 5/353* | (2006.01) |

(52) U.S. Cl.
CPC . *G01B 7/16* (2013.01); *G01L 7/166* (2013.01); *G01D 5/04* (2013.01); *G01D 5/268* (2013.01); *G01D 5/35316* (2013.01)

(58) Field of Classification Search
CPC ........... G01B 7/16; G01D 5/04; G01D 5/268; G01L 7/166
USPC ........ 73/862, 800, 774; 138/30; 356/482, 614
See application file for complete search history.

(56) References Cited

U.S. PATENT DOCUMENTS

| | | | |
|---|---|---|---|
| 7,009,707 B2 | 3/2006 | Beresford et al. | 356/478 |
| 7,974,503 B2 | 7/2011 | Huang et al. | 385/13 |

(Continued)

FOREIGN PATENT DOCUMENTS

| | | | | |
|---|---|---|---|---|
| CN | 101625230 A | 1/2010 | | G01B 11/02 |
| CN | 202074949 U | 12/2011 | | G01B 11/02 |

(Continued)

OTHER PUBLICATIONS

European Search Report, Application No. 12180901.6, 6 pages, Jan. 28, 2013.
European Search Report, Application No. 12180889.3, 7 pages, Feb. 8, 2013.

*Primary Examiner* — Lisa Caputo
*Assistant Examiner* — Tran M Tran
(74) *Attorney, Agent, or Firm* — Slayden Grubert Beard PLLC

(57) ABSTRACT

A displacement sensor for sensing the displacement of a movable component of a device is provided. A flexible element of the displacement sensor includes a mounting portion mounted to the device and a coupling portion spaced apart from the mounting portion. A displacement conversion mechanism is coupled to the movable component and is further coupled to the coupling portion of the flexible element. The displacement conversion mechanism is configured to convert a larger displacement of the movable component into a smaller displacement of the coupling portion of the flexible element. The flexible element is arranged such that a displacement at the coupling portion causes the flexible element to bend.

16 Claims, 3 Drawing Sheets

(56) References Cited

U.S. PATENT DOCUMENTS

| | | | |
|---|---|---|---|
| 2002/0174728 A1 | 11/2002 | Beresford et al. | 73/861 |
| 2009/0180730 A1 | 7/2009 | Foster et al. | 385/13 |
| 2009/0297089 A1* | 12/2009 | Huang et al. | 385/12 |
| 2011/0203379 A1 | 8/2011 | Virtanen et al. | 73/708 |
| 2012/0247213 A1 | 10/2012 | Zumberge et al. | 73/653 |
| 2014/0047925 A1 | 2/2014 | Brekke et al. | 73/774 |
| 2014/0048163 A1 | 2/2014 | Brekke et al. | 138/30 |
| 2014/0112094 A1 | 4/2014 | Fernihough | 367/7 |

FOREIGN PATENT DOCUMENTS

| | | | | |
|---|---|---|---|---|
| EP | 2169690 A1 | 3/2010 | | E21B 33/038 |
| EP | 2169690 B1 * | 8/2012 | | |
| GB | 2221534 A | 2/1990 | | G01L 1/04 |
| KR | 20110037314 A | 4/2011 | | G01B 11/16 |
| KR | 101057309 B1 | 8/2011 | | G01B 11/16 |

* cited by examiner

DISPLACEMENT SENSOR, IN PARTICULAR FOR USE IN A SUBSEA DEVICE

CROSS-REFERENCE TO RELATED APPLICATIONS

This application claims priority to EP Patent Application No. 12180901 filed Aug. 17, 2012. The contents of which is incorporated herein by reference in its entirety.

TECHNICAL FIELD

This disclosure relates to a displacement sensor for sensing the displacement of a movable component of a device, in particular of a subsea device such as a pressure compensator. The disclosure further relates to a method of sensing the displacement of a movable component of a device.

BACKGROUND

Oil platforms are often used in offshore oil and gas production. More recently, processing facilities are being relocated to the ocean floor. Such subsea installations may be located in considerable water depths, for example in a depth of more than 1.000, 2.000 or even more than 3.000 meters. At such water depths, corresponding pressures of about 100, 200 or 300 bar, respectively, prevail. The devices forming part of such subsea installation do accordingly need to be capable of handling such high ambient pressures.

One possibility of handling high pressures is the use of a pressure resistant enclosure which maintains a close to atmospheric pressure inside, thus enabling the use of standard topside components. A further possibility is the use of a pressure compensated enclosure. Such enclosure generally comprises a pressure compensation system, or pressure compensator, which balances the pressure inside the enclosure to the pressure prevailing in the ambient seawater. Due to the large volume changes experienced by gases when increasing the pressure, the pressure compensated enclosure is generally filled with a dielectric liquid, thus keeping the volume changes which the liquid experiences and which the pressure compensator needs to compensate relatively low.

When using such pressure compensated enclosure, it is desirable to know which status the pressure compensator has at any point in time and whether the pressure compensator operates correctly. In conventional subsea devices, only pressure sensors are available for determining the pressure inside the subsea device, which may indicate the functioning of the pressure compensator. A particular problem is that due to the pressure and temperature differences between the topside and the ocean floor, relatively large volume differences can occur, resulting in large variations of the pressure compensator. Large variations are difficult to measure with high precision, and furthermore, the sensors available are generally not operable in the environment prevailing inside a pressure compensated subsea device, i.e. within a dielectric liquid at high pressures. It is thus desirable to measure relatively large displacements with high accuracy in such difficult environment.

SUMMARY

One embodiment provides a displacement sensor for sensing the displacement of a movable component of a device, the displacement sensor comprising a flexible element mounted to the device at a mounting portion, the flexible element further having a coupling portion spaced apart from the mounting portion, a displacement conversion mechanism coupled to the movable component and further coupled to the flexible element at the coupling portion, wherein the displacement conversion mechanism is configured to convert a larger displacement of the movable component into a smaller displacement of the flexible element at the coupling portion, the flexible element being arranged such that a displacement at the coupling portion causes the flexible element to bend, and a fiber optic strain sensor attached to the flexible element in such way that a bending of the flexible element can be detected as strain by the fiber optic strain sensor.

In a further embodiment, the flexible element comprises a plate, preferably a metal plate, more preferably an aluminium plate.

In a further embodiment, the flexible element is an elongated plate having two ends in longitudinal direction, the mounting portion being adjacent to one of said ends, the coupling portion being adjacent to the other of said ends.

In a further embodiment, the movable component is movable in a first direction, and wherein the flexible element extends in a second direction that is substantially perpendicular to the first direction.

In a further embodiment, the displacement conversion mechanism is configured such that a movement of the movable component in the first direction is at least partially converted into a movement of the coupling portion into the second direction.

In a further embodiment, the movable component is movable in a first direction, and wherein the displacement conversion mechanism comprises an elongated member attached to the movable component and extending substantially parallel to the first direction.

In a further embodiment, the displacement conversion mechanism comprises a support member mounted to the device and having a guiding element which contacts the elongated member to guide a movement of the elongated member together with the movable component in the first direction.

In a further embodiment, the movable component is movable in a first direction, wherein the displacement conversion mechanism comprises a elongated member attached to the movable component, the elongated member having an elongated engagement portion extending at an angle, in particular at an acute angle, to the first direction, the flexible element having an engagement member at the coupling portion which is in engagement with the engagement portion of the elongated member.

In a further embodiment, the engagement portion comprises at least one of a slit, a groove, a recess, or one or more ridges.

In a further embodiment, the engagement member comprises at least one of a protrusion, a bar, or a knob.

In a further embodiment, the engagement portion is a slit extending at an acute angle with respect to the first direction from a first position to a second position, and wherein the engagement member is a bar that reaches through the slit, the bar sliding in the slit when the elongated member is moved together with the movable component, the slit being arranged such that when the engagement member is located at the first position, the flexible element is unbent and when the engagement member is located at the second position, the flexible element is bent.

In a further embodiment, the fibre optic strain sensor comprises an optical fiber having at least one fiber Bragg grating, a length of the optical fiber which includes the at least one fiber Bragg grating being attached to the flexible element in a direction substantially parallel to the longitudinal extension of the flexible element, in particular between the mounting portion and the coupling portion.

In a further embodiment, the fibre optic strain sensor comprises an optical fiber having plural fiber Bragg gratings, the optical fiber being attached to the flexible element such that the fiber Bragg gratings are distributed along the flexible element between the mounting portion and the coupling portion.

Another embodiment provides a pressure compensator for a subsea device comprising a displacement sensor as disclosed above, wherein the movable component forms part of the pressure compensator and is movable to change an internal volume of the pressure compensator, wherein the displacement sensor is configured to detect changes of the internal volume of the pressure compensator by detecting a displacement of the movable component.

Another embodiment provides a method of sensing the displacement of a movable component of a device, in particular of a pressure compensator of a subsea device, comprising the steps of providing a flexible element mounted to the device at a mounting portion, the flexible element having a coupling portion spaced apart from the mounting portion, providing a displacement conversion mechanism coupled to the movable component and further coupled to the flexible element at the coupling portion, converting a larger displacement of the movable component of the device to a smaller displacement and applying the smaller displacement to the flexible element at the coupling portion so as to bend the flexible element, and detecting the bending of the flexible element using a fiber optic strain sensor.

BRIEF DESCRIPTION OF THE DRAWINGS

Example embodiments are discussed below in detail with reference to the drawings, in which.

DETAILED DESCRIPTION

Figure 1:
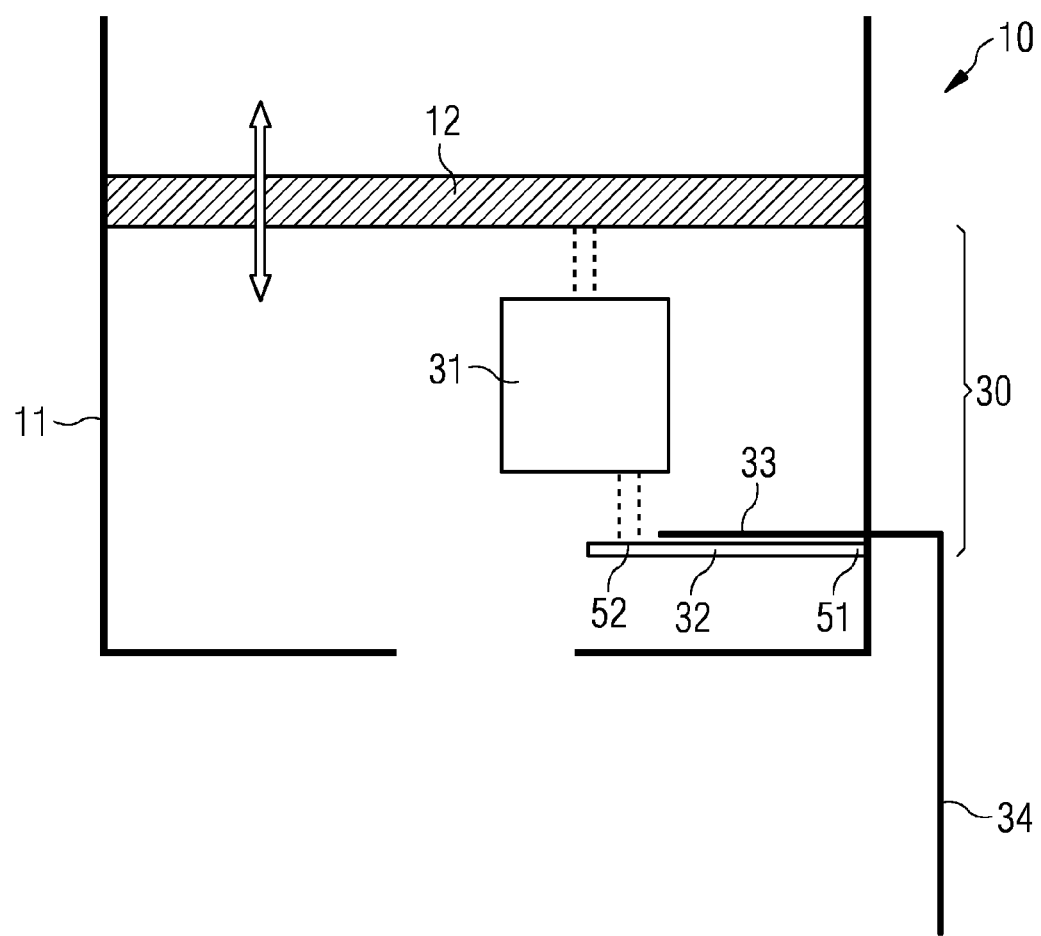
FIG. 1 is a schematic diagram showing an example subsea device comprising an example displacement sensor according to one embodiment of the invention.

Some embodiments provide a displacement sensor that is capable of detecting relatively large displacements with high precession, and which is operable in a pressure compensated subsea device.

One embodiment provides a displacement sensor for sensing the displacement of a movable component of a device. The displacement sensor comprises a flexible element mounted to the device at a mounting portion, the flexible element further having a coupling portion spaced apart from the mounting portion. The displacement sensor comprises a displacement conversion mechanism coupled to the movable component and further coupled to the flexible element at the coupling portion. The displacement conversion mechanism is configured to convert a larger displacement of the movable component into a smaller displacement of the flexible element at the coupling portion. The flexible element is arranged such that the displacement at the coupling portion causes the flexible element to bend. The displacement sensor further includes a fiber optic strain sensor attached to the flexible element in such way that a bending of the flexible element can be detected as strain by the fiber optic strain sensor.

By means of the displacement conversion mechanism, a relatively large movement may be converted into a smaller movement which is detectable with high precession. In particular, the use of the fiber optic strain sensor enables a detection of the bending of the flexible element and thus of the displacement at the coupling portion with enhanced precision. Since the displacement conversion mechanism may only comprise mechanical elements, and furthermore, since an optical fiber is generally relatively insensitive to its environment, the displacement sensor can be employed in a pressurized, dielectric liquid filled environment, in particular inside a pressure compensated enclosure of a subsea device, for example inside a pressure compensator.

In one embodiment, the flexible element comprises a plate. The plate may for example be a metal plate, in particular, it may be an aluminum plate. A light weight but robust displacement sensor may thus be achieved.

The flexible element may be an elongated plate having two ends in longitudinal direction. The mounting portion may be adjacent to one of the ends, and the coupling portion may be adjacent to the other of the ends. In particular, the elongated plate may be mounted at one of its ends to the device, and in proximity to the other of its ends, it may be coupled to the displacement conversion mechanism.

In one embodiment, the movable component may be movable in a first direction, and the flexible element may extend in a second direction that is substantially perpendicular to the first direction. Application of a force to the flexible element at the coupling portion is thus facilitated.

The displacement conversion mechanism may be configured such that a movement of the movable component is at least partially converted into a movement of the coupling portion of the flexible element towards the mounting portion of the flexible element, so as to cause the flexible element to bend.

The displacement conversion mechanism may be configured such that a movement of the movable component in the first direction may at least partially be converted into a movement of the coupling portion into the second direction. By such movement, the flexible element may be caused to bend.

In one embodiment, the movable component may be movable in a first direction, and the displacement conversion mechanism may comprise an elongated member attached to the movable component and extending substantially parallel to the first direction.

The displacement conversion mechanism may comprise a support member mounted to the device and having a guiding element which contacts the elongated member to guide a movement of the elongated member together with the movable component in the first direction. The displacement conversion mechanism may thus be stabilized and made more robust.

The guiding element may for example comprise at least two rollers mounted to a frame of the support member. The frame may be attached to the device, and the rollers may contact the elongated member on opposite sides thereof, for example to prevent a flexing of the elongated member. The rollers may roll along the longitudinal direction of the elongated member.

In one embodiment, the movable component is movable in a first direction, and the displacement conversion mechanism comprises an elongated member attached to the movable component, the elongated member having an elongated engagement portion extending at an angle, in particular at an acute angle, to the first direction. The flexible element may have an engagement member at the coupling portion which is in engagement with the engagement portion of the elongated member. In such way, a relatively simple conversion of a larger displacement into a smaller displacement may be achieved, while at the same time, a simple coupling between the displacement conversion mechanism and the flexible element may be provided.

The elongated engagement portion may for example extend at an acute angle in such way that the elongated engagement portion is angled towards or away from the mounting portion. In particular, the elongated engagement portion may lie within a plane defined by the first direction and by the direction in which the flexible element extends.

By means of the angle of the engagement portion, the ratio of the displacement of the movable component to the displacement of the flexible element at the coupling portion may be adjustable. An effective means for adjusting the displacement ratio may thus be provided.

The engagement portion may comprise at least one of a slit, a groove, a recess, or one or more ridges. As an example, a slit may be provided in which the engagement member can move, or parallel ridges may be provided between which the engagement member is received.

The engagement member may for example comprise at least one of a protrusion, a bar, or a knob. It may for example comprise a bar in transverse direction of an elongated flexible element, which may be in engagement with an engagement portion in form of a slit, or in another example, it may include one or more conical or cylindrical protrusions, which may for example be in engagement with one or two pairs of parallel ridges.

In one embodiment, the engagement portion is a slit extending at an acute angle with respect to the first direction from a first position to a second position, and the engagement member is a bar that reaches through the slit (in particular perpendicular to the slit), wherein the bar is slidable within the slit when the elongated member is moved together with the movable component. The slit may be arranged such that when the engagement member is located at the first position, the flexible element is not bent, i.e. it may be in an equilibrium position, and when the engagement member is located at the second position, the flexible element is bent. A relatively simple mechanical mechanism may thus be provided, which is robust and applicable in a dielectric liquid filled and pressure compensated subsea device. At the same time, an effective conversion of a larger displacement of the movable component into a smaller displacement of the coupling portion of the flexible element can be achieved.

In one embodiment, the fiber optic strain sensor comprises an optical fiber having at least one fiber Bragg grating (FBG). A length of the optical fiber which includes the fiber Bragg grating is attached to the flexible element in a direction parallel to the longitudinal extension of the flexible element, in particular between the mounting portion and the coupling portion. With such type and arrangement of the optical fiber, a bending of the flexible element may be measured with high precision. Accordingly, the displacement of the movable component can be determined precisely in an effective way. The fiber Bragg grating can be highly sensitive to a strain variations (in particular the Bragg wavelength at which the fiber Bragg grating reflects light), and by means of the attachment of the optical fiber, strain is effectively transferred from the flexible element to the optical fiber. A bending of the flexible element may thus result in stain within the optical fiber, with corresponding changes in the optical properties of the fiber Bragg grating, which are detectable with high sensitivity by light transported within the optical fiber.

In one embodiment, the fiber optic strain sensor may comprise an optical fiber having plural fiber Bragg gratings, and the optical fiber may be attached to the flexible element such that the fiber Bragg gratings are distributed along the flexible element between the mounting portion and the coupling portion. Strain and thus the bending of the flexible element may thus be measured at different positions along the flexible element, giving a precise measurement of the displacement of the flexible element at the coupling portion. The precision with which the displacement of the movable component is detected may thus be improved.

The maximum displacement of the movable component may be at least 100 mm, preferably at least 250 mm, and more preferably at least 500 mm. The maximum displacement of the movable component of the device may for example lie within a range of about 250 to about 2.000 mm, preferably within a range of about 500 to about 1.500 mm.

The displacement conversion mechanism may be configured such that the maximum displacement of the flexible element at the coupling portion may lie within a range of about 1 to about 100 mm, preferably within a range of about 10 to about 50 mm.

A further embodiment provides a pressure compensator for a subsea device, comprising a displacement sensor according to any of the above described configurations. The movable component forms part of the pressure compensator and is movable to change an internal volume of the pressure compensator. The displacement sensor is configured to detect changes of the internal volume of the pressure compensator by detecting a displacement of the movable component.

Accordingly, by means of such pressure compensator including the displacement sensor, the status of the pressure compensator, in particular of the current size of its internal (compensation) volume, can be measured on request, continuously or at time intervals. Measurements are possible even if the subsea device towards which the pressure compensator is mounted is deployed subsea. The pressure compensator may have a relatively large internal volume, for example when being used for providing pressure compensation for a subsea transformer, and the displacement sensor allows variations of such large internal volume to be measured with high precision.

In one embodiment, the pressure compensator may be configured to provide pressure compensation for the subsea device up to a deployment water depths of at least 1.000 preferably 2.000, more preferably at least 3.000 meters.

In one embodiment, the movable component is a lid of a bellow or a cylinder of the pressure compensator. The displacement conversion mechanism may be mounted to the lid. In the above mentioned application, the lid may make relatively large movements, for example within a range of about 100 to about 2.000 mm, which are still detectable by means of the displacement sensor comprising the displacement conversion mechanism.

It should be clear that other configurations of the pressure compensator are also conceivable. As an example, the movable component may be a membrane of the pressure compensator, and the displacement conversion mechanism may be mounted to the membrane in order to make larger movements of the membrane detectable in any of the above described ways.

A further embodiment provides a method of sensing the displacement of a movable component of a device, in particular the displacement of a movable component of a pressure compensator of a subsea device. The method comprises the steps of providing a flexible element mounted to the device at a mounting portion, wherein the flexible element has a coupling portion spaced apart from the mounting portion; providing a displacement conversion mechanism coupled to the movable component and further coupled to the flexible element at the coupling portion; converting a larger displacement of the movable component of the device into a smaller displacement and applying the smaller displacement to the flexible element at the coupling portion so as to bend the flexible element; and detecting the bending of the flexible element by means of a fiber optic strain sensor. By means of the method, similar advantages as the ones outlined further above with respect to the displacement sensor may be achieved.

In one embodiment, the method may be performed by the displacement sensor in any of the above outlined configurations.

The features of the embodiments of the invention mentioned above and those yet to be explained below can be combined with each other unless noted to the contrary.

In the following, example embodiments of the invention will be described in detail with reference to the accompanying drawings. It is to be understood that the following description of the embodiments is given only for the purpose of illustration and is not to be taken in a limiting sense.

It should be furthermore be noted that the drawings are to be regarded as being schematic representations only, and elements in the drawings are not necessarily to scale with each other. Rather, the presentation of the various elements is chosen such that their function and general purpose become apparent to a person skilled in the art.

FIG. 1 is a schematic drawing showing a subsea device 10, which may for example be or comprise a pressure compensator, and which has an enclosure 11 and a movable component 12 which is movable with respect to the enclosure 11. In the example of FIG. 1, the enclosure 11 has a cylindrical shape, and the movable component 12 moves in axial direction of the cylindrical shape. Movable component 12 may thus correspond to a lid or piston which moves inside the cylindrical enclosure 11 to change the inner volume thereof.

The subsea device 10 comprises a displacement sensor 30 according to an embodiment of the invention. The displacement sensor 30 comprises a displacement conversion mechanism 31 which is connected to or mounted to the movable component 12. The displacement sensor 30 further comprises a flexible element 32 which is at a mounting portion 51 mounted to the enclosure 11 of the device 10. The displacement conversion mechanism 31 is coupled to the flexible element 32 at a coupling portion 52. The coupling portion 52 is spaced apart from the mounting portion 51 of the flexible element 32. In operation, the displacement conversion mechanism 31 converts a larger displacement of the movable component 12 into a smaller displacement applied to the flexible element 32 at the coupling portion 52. The displacement of the coupling portion 52 causes the flexible element 32 to bend, which is detected optically by means of an fiber optic strain sensor 31 attached to the flexible element 32. The fiber optic strain sensor 33 is for example interrogated optically by means of a fiber optic connection 34. The flexible element 32 and the fiber optic strain sensor 33 may form a fiber optic displacement sensor.

The displacement conversion mechanism 31 is configured to convert a larger displacement into a smaller displacement. It can be implemented in a variety of ways. In some embodiments, it can be mounted or attached to the movable component 12 and may thus mostly move together with the movable component 12. In other embodiments, it may be mounted to the enclosure 11 of the device 10, and may have a moving element which is coupled to the movable component 12. In some embodiments, it may comprise a gear box which converts a larger movement of movable component 12 into a smaller displacement which is applied to flexible element 32. In other embodiments, it may comprise a simple mechanical guiding mechanism which coupling portion 52 of the flexible element 32 engages in such way that the flexible element 32 bends, as explained hereinafter with respect to FIG. 2.

In the example of FIG. 1, an embodiment is illustrated in which a displacement of the movable component 12 along the arrows illustrated in FIG. 1 is converted into a smaller displacement in the same direction which is applied to the movable component 32 in order to bend the movable component 32. This means that the flexible element 32 experiences at the coupling point 52 a force that is substantially parallel to the direction of displacement of movable component 12. In other embodiments, the displacement conversion mechanism 31 may be configured so that the force is applied in another direction, for example substantially perpendicular to this first direction defined by the motion of movable component 12 (as indicated by arrows). If a force is applied at coupling portion 52 of flexible element 32 towards the mounting portion 51, the flexible element 32 will also be forced to bend (if the magnitude of the force is high enough). In other embodiments, for example the embodiment depicted in FIG. 2, a mixture of such forces can be applied to the flexible element 32 at coupling portion 52.

The conversion ratio of the displacement conversion mechanism will be chosen in accordance with the particular application, i.e. with the maximum displacement of the movable component 12 and the displacement required at coupling portion in order to achieve a bending of the flexible element 32 that is detectable with the required precision. As an example, the maximum displacement of movable component 12 may lie within a range about 500 to about 1.500 mm, whereas the displacement at coupling portion 52 for this maximum displacement of the movable component 12 may lie within a range of about 5 mm to about 50 mm. The conversion ratio may then be a ratio according to a combination of any two values out of these two ranges, it may for example lie between about 10:1 and about 300:1. It should be clear that these are only some specific examples given for the purpose of illustration, and that embodiments of the displacement sensor may be realized with different than the above mentioned maximum displacements and conversion values.

For detecting the bending of the flexible element 32, a fiber optic strain sensor 33 is attached to the flexible element 32. As an example, the fiber optic strain sensor 33 may be provided by a length of optical fiber that is over this length firmly attached to the flexible element 32. The length of the optical fiber is oriented substantially parallel to the longitudinal direction of a flexible element 32. The length of optical fiber attached to flexible element 32 may comprise one or more fiber Bragg gratings (FBGs), which are distributed along the length of optical fiber. Due to the firm attachment to flexible element 32, a bending of the flexible element 32 causes strain within the firmly attached length of optical fiber, thereby changing the optical characteristics of the fiber Bragg gratings. Each fiber Bragg grating can be configured to have a wavelength (Bragg wavelength) at which it reflects light, the light being transmitted at most of the other wavelengths. Such fiber Bragg grating can be generated inside the optical fiber by a variation of the refractive index of the fiber core. The Bragg wavelength is sensitive to strain, so that applied strain shifts the Bragg wavelength. This can be detected optically since the wavelength of light which is reflected by the fiber Bragg grating is shifted. This can be can be measured (in transmission or in reflection) by a spectroscopic measurement. Plural strain sensors can be realized within the same optical fiber by using fiber Bragg gratings having different Bragg wavelengths, wherein each Bragg grating can be interrogated by monitoring reflection or transmission at a different optical wavelength, which corresponds to optical multiplexing.

Besides being sensitive to strain, the Bragg wavelength of fiber Bragg gratings is generally also sensitive to temperature. To make a temperature independent measurement of strain, the length of optical fiber used as fiber optic strain sensor 33 may extend around the flexible element 32 in such way that strain is induced and measured both at the upper and the lower side of flexible element 32. The compression experienced at the lower side of flexible element 32 can similarly be measured by means of the fiber Bragg gratings (i.e. the optical fiber may also be firmly attached to the lower side of the flexible element 32). From the strain profile of the upper and the lower side of flexible element 32, a temperature independent determination of the deflection of flexible element 32 at the coupling portion 52 is possible. On the other hand, the temperature dependent of strain measurement by means of FBG sensors may be avoided by making an additional temperature measurement, for example by an additional temperature sensor, or by a decoupled fiber Bragg grating which is not exposed to strain (e.g. in a loop of optical fiber). The temperature effect on the FBG strain sensors in the fiber optic strain sensor 33 can then be eliminated. Another possibility is the assumption of a relatively constant temperature and a corresponding gauging of the displacement sensor, which might be feasible for subsea applications in which the environmental temperature remains relatively constant (e.g. between 1 and 5° C.).

For measuring actual displacement at the coupling portion 52 of flexible element 32, a gauge measurement may for example be performed, in which strain curves for a particular displacement of movable component 12 are identified. After gauging the fiber optic strain sensor 33, precise optical measurements of the displacement of movable component 12 become possible. The fiber Bragg gratings may for example be interrogated by means of the fiber optic connection 34, through which light of different wavelengths can be transmitted.

It should be clear that the above mentioned types of measurements for determining displacements of flexible element 32 at coupling portion 52 are only examples, and that other types of arrangements of the fiber optic strain sensor 33 are also conceivable. Also, other types of fiber optic strain sensors may be used, for example polarization dependent sensors or the like. The type and arrangement of fiber optic strain sensor used within the displacement sensor 30 will depend on the particular type of application and environment.

Figure 2:
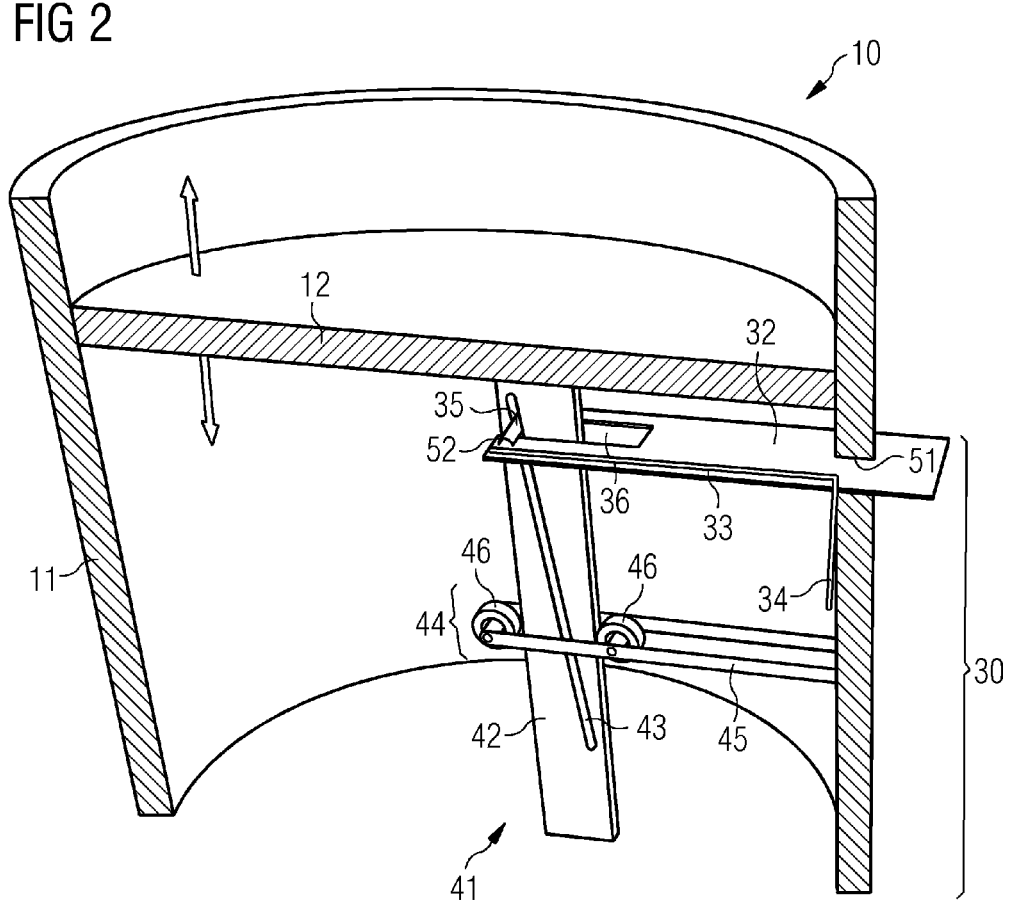
FIG. 2 is a schematic diagram showing an example subsea device in form of a pressure compensator according to one embodiment of the invention comprising a displacement sensor employing a flexible plate with an attached optical fiber.

FIG. 2 is a schematic drawing showing a subsea device 10 comprising a particular embodiment of the displacement sensor 30. The fiber optic strain sensor 33 can be configured as described above. The flexible element 32 is provided in form of an elongated plate, which is affixed at the mounting portion 51 to the enclosure 11 of device 10. The elongated plate of flexible element 32 extends essentially perpendicular to the direction of movement of the movable component 12 (indicated by arrows). At coupling portion 52, the flexible element 32 has an engagement member in form of a bar 35. The bar 35 extends substantially in transverse direction compared to the longitudinal direction of flexible element 32. The elongated plate has further an opening 36. As can be seen, a length of optical fiber is attached to the upper side of the elongated plate, and it may also be attached to the lower side. The elongated plate may be a metal plate, it may for example be an aluminum plate.

The displacement sensor 30 of the embodiment of FIG. 2 comprises a displacement conversion mechanism 41. The displacement conversion mechanism 41 includes an elongated member 42, which extends substantially parallel to the direction of movement of the movable component 12, and which is attached to the movable component 12. The elongated element 42 comprises an engagement portion 43. Engagement portion 43 is elongated and extends at an acute angle to the direction of movement of movable component 12 (indicated by arrows). As can be seen in FIG. 2, elongated member 42 and engagement portion 43 may be realized by means of a elongated plate having a slit provided therein. The engagement member 35 of the flexible element 32 is in engagement with the engagement portion 33 of the elongated member 42. In particular, the bar 35 reaches through the slit 43 and is movable along the slit.

The displacement conversion mechanism 41 furthermore comprises a support member 44, which is mounted to the enclosure 11 of device 10. The support member 44 comprises a frame 45 affixed to enclosure 11, and furthermore comprises rollers 46 which contact the elongated member 42 at opposite faces thereof. The support member 44 accordingly provides guidance when the elongated member 42 moves together with the moveable component 12 in direction of the arrows. In particular, a flexing of the elongated member 42 due to a force applied by the engagement member 35 of the flexible element 32 may be prevented, thereby ensuring that a movement of movable component 12 will lead to a proportional displacement and bending of the flexible element 32.

As can be seen from FIG. 2, the engagement portion 43 is angled towards the mounting point 51. In FIG. 1, the displacement sensor 30 is shown in a situation in which the engagement member 35 is located at a fist position within the engagement portion 43 which the flexible element 32 is essentially unbent, i.e. no force is applied to the flexible element 32 at its coupling portion 52. Staring from this position, if the movable component 12 together with the elongated member 42 is moved upwards, the bar 35 is forced to move within the slit 43. The angled slit 43 will force the bar to move towards the mounting portion 51, thereby bending the flexible element 32. The larger the displacement in upward direction of the moveable component 12, the more the flexible element 32 will be bent. This is detected by means of the fiber optic strain sensor 33. The support member 44 prevents that instead of the flexible element 32, the elongated member 42 is bent. In the example of FIG. 2, the slit 43 ends at a second position at which the flexible element 32 is bent at its maximum. The usable measurement range of the displacement sensor 30 may lie between the first and the second position.

It should be clear that the displacement sensor 30 shown in FIG. 2 is only a particular example and can be modified in various ways. For example, the engagement portion 43 may be angled the other way, so that the equilibrium position of flexible element 32 is reached when the movable component 12 is moved to its maximum upward position. Instead of a slit, engagement portion 43 may comprise a groove or parallel ridges, in which for example an engagement member 35 in from of a knob or a protrusion is engaged. Also, the elongated member 42 may be made sturdy enough so that no support member is required, or the support member 44 may be configured differently, e.g. mounted to a different position, comprising no rollers or more rollers or the like. Also, the flexible element 32 does not need to extend perpendicular to the direction of motion of the movable component 12, it may in other embodiments extend substantially parallel thereto, with the displacement conversion mechanism 41 comprising corresponding means for changing the direction of displacement, such as a gear affixed to the enclosure 11, a bent lever, a rocker or the like.

The subsea device 10 illustrated in FIGS. 1 and 2 may for example be a pressure compensator. As such, the subsea device 10 may be mounted to another subsea device, in particular its enclosure, which requires pressure compensation.

Figure 3:
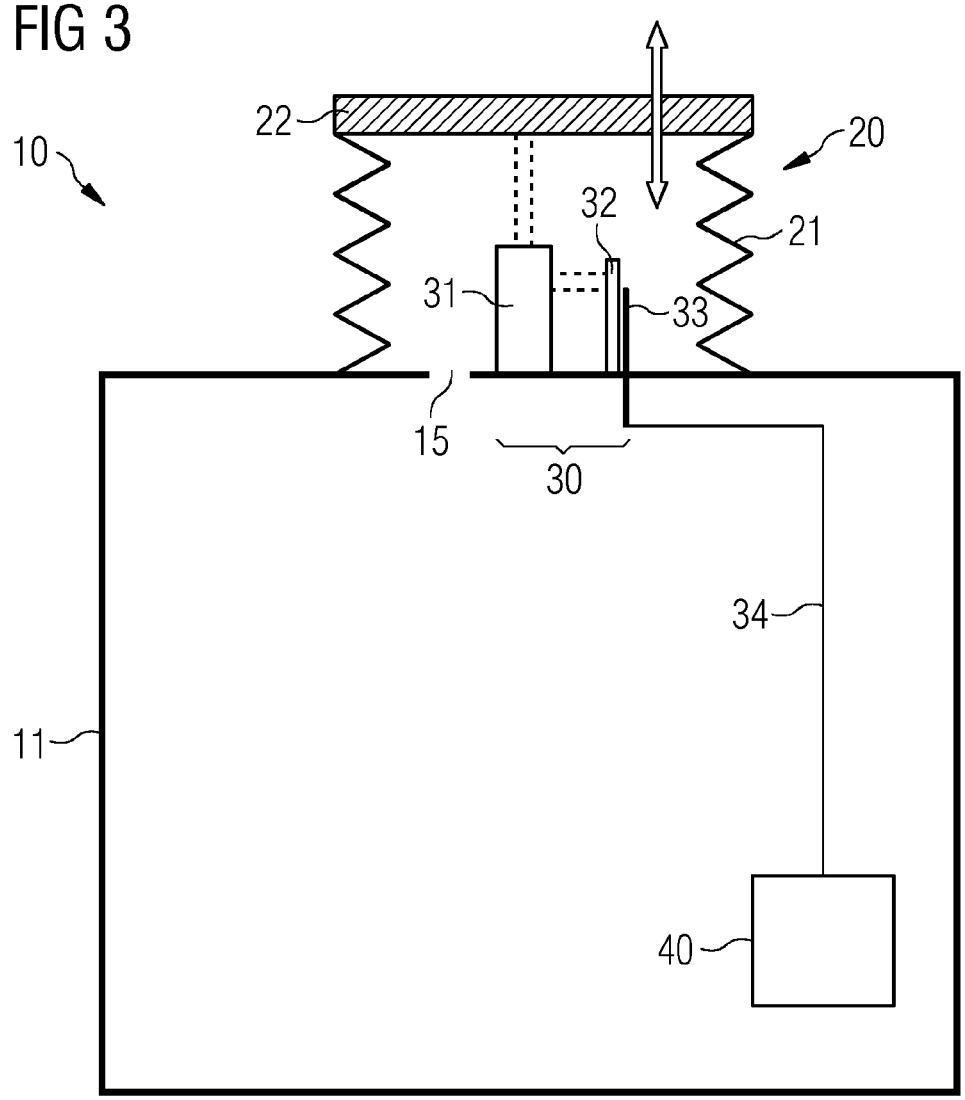
FIG. 3 is a schematic diagram showing an example subsea device comprising an example pressure compensator, wherein a displacement sensor according to one embodiment is located inside the pressure compensator.

FIG. 3 shows a subsea device 10 comprising a pressure compensator 20 in accordance with an embodiment of the invention. Inside the pressure compensator 20, a displacement sensor 30 comprising the displacement conversion mechanism 31, the flexible element 32 and the fiber optic strain sensor 33 is provided. The subsea device 10 has a movable component in form of the lid 22 of the pressure compensator 20. Pressure compensator 20 is implemented by a bellow comprising an enclosure in form of corrugated side walls 21 and the lid 22. The bellow is mounted onto the housing 11 the subsea device 10.

The housing 11 is filled with a dielectric liquid and is pressure compensated to the surrounding ambient pressure by means of the pressure compensator 20. This means that if the volume of the dielectric liquid inside the housing 11 changes, e.g. due to a temperature change or a pressure change, the volume change is taken up by pressure compensator 20, in particular by a movement of the lid 22. For this purpose, an opening 15 is provided between the interior of housing 11 and the interior of the pressure compensator 20, so that dielectric liquid can flow between the pressure compensator and the housing. Accordingly, no significant overpressure or underpressure compared to the ambient pressure can build up inside the housing 11.

The displacement conversion mechanism 31 is coupled to the lid 22 of the pressure compensator 20. In the example illustrated in FIG. 3, a vertical movement of the lid 22 is converted into a horizontal displacement applied to the flexible element 32. In other embodiments, the displacement sensor 30, in particular the displacement conversion mechanism 31 can be configured as described above with respect to FIGS. 1 and 2, so the explanations given above apply correspondingly.

The lid 22 of pressure compensator 20 may for example have a maximum allowable movement of about one meter. Displacement conversion mechanism 31 may reduce this maximum movement to a maximum displacement of about 10-25 mm applied to flexible element 32, which is detected by fiber optic strain sensor 33.

A measuring unit 40 located in the subsea device 10 may further be provided and may be part of the displacement sensor 30. The measuring unit 40 is connection via fiber optic connection 34 to the fiber optic strain sensor 33. Measuring unit 40 may for example include a light source for providing white light or light of a particular wavelength to the fiber optic strain sensor 33. It should be clear that in some embodiments, a single optical fiber may provide both the fiber optic strain sensor 33 and the fiber optic connection 34, while in other embodiments, plural optical fibers and fiber optic connectors may be used. A light source within measuring unit 40 may for example supply via the fiber optic connection light of different wavelengths to the fiber optic strain sensor 33 for interrogating one or more fiber Bragg gratings disposed therein. The light reflected or transmitted through the fiber Bragg gratings is guided via the fiber optic connection 34 to the measuring unit 40, where it is analyzed. Measuring unit 40 may for example employ spectroscopic measuring techniques for determining the wavelengths of the light received from the fiber optic strain sensor 33. Measuring unit 40 may furthermore evaluate the detected signal, e.g. for determining the position of the movable component 22 of pressure compensator 20, or for determining whether pressure compensator 20 operates according to specifications. Measuring unit 40 may communicate such evaluation results to a topside installation, or it may communicate the measured signal to a topside installation for being evaluated.

Note that although a pressure compensator 20 which has the form of a bellow is illustrated in FIG. 3, it should be clear that the invention is not restricted to such pressure compensator, but different types of pressure compensators may be employed (e.g. a double bellow compensator, a piston-type compensator, a membrane-type compensator or the like). Also, it should be clear that the above described displacement sensor 30 may be used for measuring displaced in devices other than pressure compensators. The above described displacement sensor has the particular benefit that it can be used under harsh conditions, such as in a pressure compensated enclosure of a subsea device. Large displacements of a movable component can distinctly or continuously be measured with high resolution. The implementation by means of the displacement conversion mechanism is comparatively simple and robust. Furthermore, the use of a fiber optic sensing technique makes any electronics within the displacement sensor obsolete, the displacement sensor thus being essentially immune to electromagnetic interference, radio frequency interference (RFI), electric discharges and the like.

Features of the above outlined embodiments can be combined with each other. The skilled person will appreciate that the above described embodiments are only examples given for the purpose of illustration, and that modifications may be made without departing from the scope of the invention.

What is claimed is:

1. A displacement sensor for sensing a displacement of a movable component of a device, the displacement sensor comprising:
    a flexible element comprising a flexible element mounting portion mounted to the device and a flexible element coupling portion spaced apart from the flexible element mounting portion,
    a displacement conversion mechanism that is (a) coupled to the movable component and (b) coupled to the flexible element by a displacement conversion mechanism connection that includes a coupling portion of the displacement conversion mechanism, the flexible element coupling portion, and a mechanical coupling between the coupling portion of the conversion mechanism and the flexible element coupling portion, wherein the displacement conversion mechanism is configured to convert a displacement of the movable component into a smaller displacement of the flexible element coupling portion, the flexible element being arranged such that the displacement of the flexible element coupling portion causes the flexible element to bend, and
    a fiber optic strain sensor coupled to the flexible element and configured to detect a bending of the flexible element as strain;
    wherein the movable component is movable in a first direction, and wherein the flexible element extends in a second direction that is substantially perpendicular to the first direction; and
    wherein the displacement conversion mechanism is configured such that a movement of the movable component in the first direction is converted into an arcuate movement of the displacement conversion mechanism connection.

2. The displacement sensor according to claim 1, wherein the flexible element comprises a metal plate.

3. The displacement sensor according to claim 1, wherein the flexible element is an elongated plate having two ends in longitudinal direction, the flexible element mounting portion being located at or near one of said ends, and the flexible element coupling portion being located at or near the other of said ends.

4. The displacement sensor according to claim 1, wherein the displacement conversion mechanism comprises an elongated member attached to the movable component and extending substantially parallel to the first direction.

5. The displacement sensor according to claim 4, wherein the displacement conversion mechanism comprises a support member mounted to the device and having a guiding element which contacts the elongated member to guide a movement of the elongated member together with the movable component in the first direction.

6. The displacement sensor according to claim 1, wherein the displacement conversion mechanism comprises an elongated member attached to the movable component, the elongated member having an elongated engagement portion extending at an angle, in particular at an acute angle, to the first direction, the flexible element coupling portion having an engagement member engaged with the engagement portion of the elongated member.

7. The displacement sensor according to claim 6, wherein the engagement portion comprises at least one of a slit, a groove, a recess, and one or more ridges.

8. The displacement sensor according to claim 6, wherein the engagement member comprises at least one of a protrusion, a bar, and a knob.

9. The displacement sensor according to claim 6, wherein:
the engagement portion comprises a slit extending at an acute angle with respect to the first direction from a first position to a second position, and
the engagement member comprises a bar that reaches through the slit, the bar configured to slide in the slit when the elongated member is moved together with the movable component,
wherein the slit is arranged such that when the engagement member is located at the first position, the flexible element is unbent and when the engagement member is located at the second position, the flexible element is bent.

10. The displacement sensor according to claim 1, wherein the fiber optic strain sensor comprises an optical fiber having at least one fiber Bragg grating, wherein a length of the optical fiber that includes the at least one fiber Bragg grating is coupled to the flexible element in a direction substantially parallel to the longitudinal extension of the flexible element, between the flexible element mounting portion and the flexible element coupling portion.

11. The displacement sensor according to claim 1, wherein the fiber optic strain sensor comprises an optical fiber having multiple fiber Bragg gratings, and wherein the optical fiber is coupled to the flexible element such that the fiber Bragg gratings are distributed along the flexible element between the flexible element mounting portion and the flexible element coupling portion.

12. The displacement sensor according to claim 1, wherein the arcuate movement of the displacement conversion mechanism connection comprising a vector component in the second direction.

13. A pressure compensator for a subsea device comprising:
a displacement sensor for sensing a displacement of a movable component of the subsea device, the displacement sensor comprising:
a flexible element comprising a flexible element mounting portion mounted to the subsea device and a flexible element coupling portion spaced apart from the flexible element mounting portion, wherein the movable component is movable in a first direction, and wherein the flexible element extends in a second direction that is substantially perpendicular to the first direction;
a displacement conversion mechanism that is (a) coupled to the movable component and (b) coupled to the flexible element by a displacement conversion mechanism connection that includes a coupling portion of the displacement conversion mechanism, the flexible element coupling portion, and a mechanical coupling between the coupling portion of the conversion mechanism and the flexible element coupling portion, wherein the displacement conversion mechanism is configured to convert a displacement of the movable component into a smaller displacement of the flexible element coupling portion, the flexible element being arranged such that a displacement at the flexible element coupling portion causes the flexible element to bend, wherein the displacement conversion mechanism is configured such that a movement of the movable component in the first direction is converted into an arcuate movement of the second direction the displacement conversion mechanism connection; and
a fiber optic strain sensor coupled to the flexible element and configured to detect a bending of the flexible element as strain,
wherein the movable component forms part of the pressure compensator and is movable to change an internal volume of the pressure compensator, and
wherein the displacement sensor is configured to detect changes of the internal volume of the pressure compensator by detecting a displacement of the movable component.

14. The pressure compensator according to claim 13, wherein the arcuate movement of the displacement conversion mechanism connection comprising a vector component in the second direction.

15. A method of sensing a displacement of a movable component of a pressure compensator of a subsea device, the method comprising:
providing a flexible element comprising a flexible element mounting portion mounted to the device, and a flexible element coupling portion spaced apart from the flexible element mounting portion, wherein the movable component is movable in a first direction, and wherein the flexible element extends in a second direction that is substantially perpendicular to the first direction,
providing a displacement conversion mechanism that is (a) coupled to the movable component and (b) coupled to the flexible element by a displacement conversion mechanism connection that includes a coupling portion of the displacement conversion mechanism, the flexible element coupling portion, and a mechanical coupling between the coupling portion of the conversion mechanism and the flexible element coupling portion, wherein the displacement conversion mechanism is configured such that a movement of the movable component in the first direction is converted into an arcuate movement of the displacement conversion mechanism connection,
converting a displacement of the movable component of the device to a smaller displacement and applying the smaller displacement to the flexible element coupling portion, thereby bending the flexible element, and detecting the bending of the flexible element using a fiber optic strain sensor.

16. The method according to claim 15, wherein the arcuate movement of the displacement conversion mechanism connection comprising a vector component in the second direction.

\* \* \* \* \*